(12) United States Patent
Branton

(10) Patent No.: US 11,827,056 B1
(45) Date of Patent: Nov. 28, 2023

(54) PNEUMATIC TIRES

(71) Applicant: Christopher A. Branton, Bossier City, LA (US)

(72) Inventor: Christopher A. Branton, Bossier City, LA (US)

(*) Notice: Subject to any disclaimer, the term of this patent is extended or adjusted under 35 U.S.C. 154(b) by 85 days.

(21) Appl. No.: 16/224,282

(22) Filed: Dec. 18, 2018

(51) Int. Cl.
*B60C 11/01* (2006.01)
*B60C 11/11* (2006.01)
*B60C 11/03* (2006.01)
*B60C 13/02* (2006.01)

(52) U.S. Cl.
CPC .......... *B60C 11/03* (2013.01); *B60C 13/02* (2013.01); *B60C 2011/0337* (2013.01); *B60C 2200/14* (2013.01)

(58) Field of Classification Search
CPC ..... B60C 11/01; B60C 13/02; B60C 11/0311; B60C 2011/0313; B60C 2200/065; B60C 2200/14; B60C 2200/08; B60C 2011/013
See application file for complete search history.

(56) References Cited

U.S. PATENT DOCUMENTS

| | | | | |
|---|---|---|---|---|
| 4,791,971 A | * | 12/1988 | Shinn | B60C 11/0311 152/209.12 |
| 5,046,541 A | * | 9/1991 | Bonko | B60C 11/0311 152/209.12 |
| 5,411,067 A | * | 5/1995 | Beeghly | B60C 11/1369 152/526 |
| 6,533,007 B1 | * | 3/2003 | McMannis | B60C 11/01 152/209.16 |
| 2002/0011293 A1 | * | 1/2002 | Zanzig | C08L 7/00 152/209.16 |
| 2005/0103416 A1 | * | 5/2005 | Rooney | B60C 11/0316 152/209.19 |
| 2017/0057295 A1 | * | 3/2017 | Kageyama | B60C 11/0304 |
| 2017/0120687 A1 | * | 5/2017 | Okawara | B60C 11/11 |
| 2018/0086155 A1 | * | 3/2018 | Matsubara | B60C 13/02 |
| 2020/0055347 A1 | * | 2/2020 | Kato | B60C 11/1384 |

* cited by examiner

*Primary Examiner* — Kendra Ly
(74) *Attorney, Agent, or Firm* — R. Keith Harrison

(57) ABSTRACT

Pneumatic tires include a tire body having a pair of tire sidewalls, a tread wall extending between the tire sidewalls and a tread portion on the tread wall. The tread portion may include alternating first and second tread patterns around the circumference of the tread wall. Each of the first and second tread patterns may have a main land protruding from the tread wall on a first side of a tread equator dividing the tread portion into equal first and second halves. A main land sidewall portion may extend from the main land and protruding from a first one of the pair of tire sidewalls. A stepped land may protrude from the tread wall on a second side of the tread equator. A stepped land sidewall portion may extend from the stepped land and protruding from a second one of the pair of tire sidewalls.

20 Claims, 9 Drawing Sheets

PNEUMATIC TIRES

FIELD

Illustrative embodiments of the disclosure relate to pneumatic tires for vehicles. More particularly, illustrative embodiments of the disclosure relate to pneumatic tires which are suitable for off-road vehicles and provide enhanced gripping capability.

SUMMARY

Illustrative embodiments of the disclosure are generally directed to pneumatic tires which are suitable for off-road vehicles and provide enhanced gripping capability. An illustrative embodiment of the pneumatic tires includes a tire body having a pair of tire sidewalls, a tread wall extending between the tire sidewalls and a tread portion on the tread wall. The tread portion may include alternating first and second tread patterns around the circumference of the tread wall. Each of the first and second tread patterns may have a main land protruding from the tread all on a first side of a tread equator dividing the tread portion into equal first and second halves. A main land sidewall portion may extend from the main land and protruding from a first one of the pair of tire sidewalls. A stepped land may protrude from the tread wall on a second side of the tread equator. A stepped land sidewall portion may extend From the stepped land and protruding from a second one of the pair of tire sidewalls.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
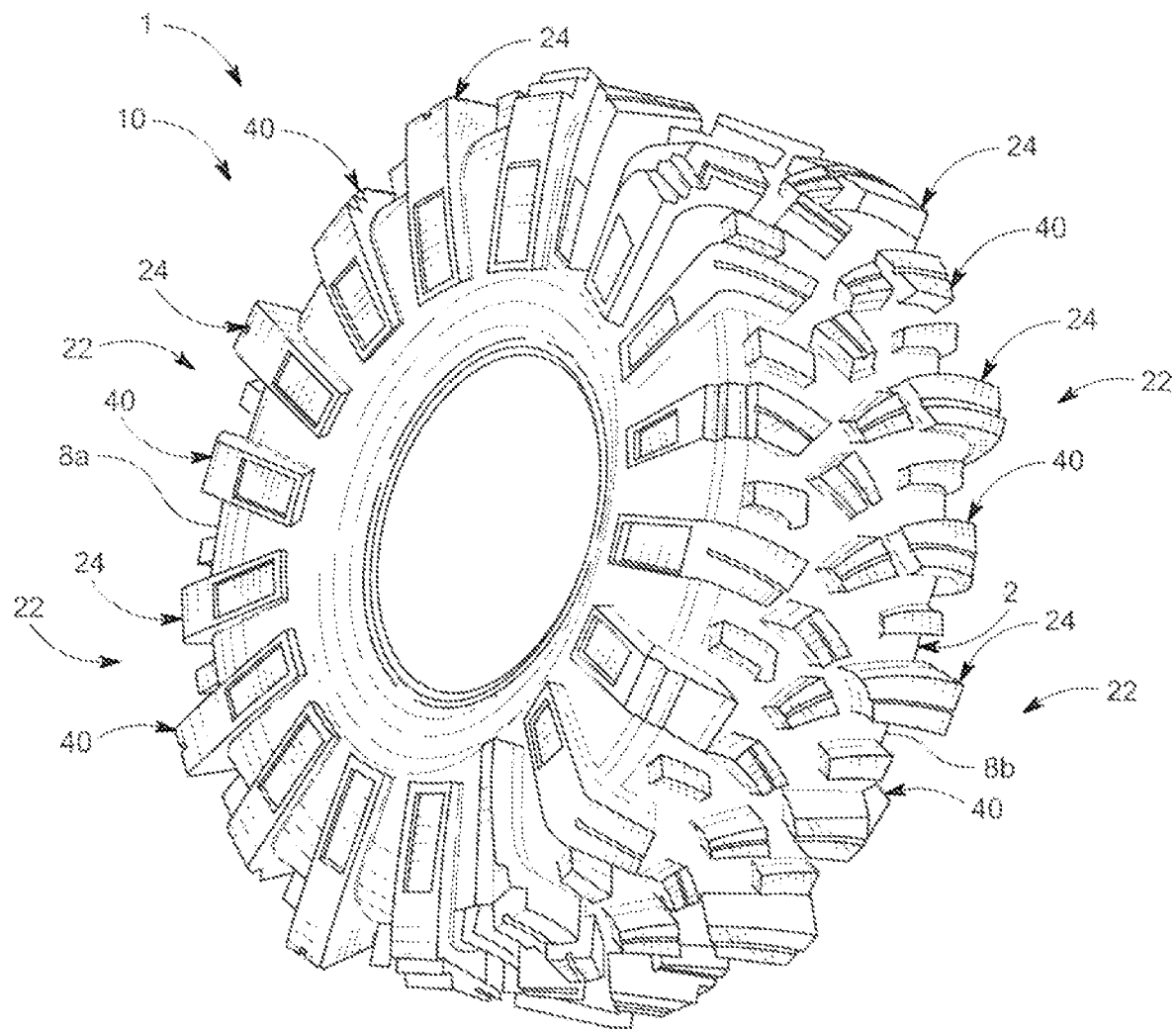
FIG. 1 is a perspective view of an illustrative embodiment of the pneumatic tires.
Figure 2:
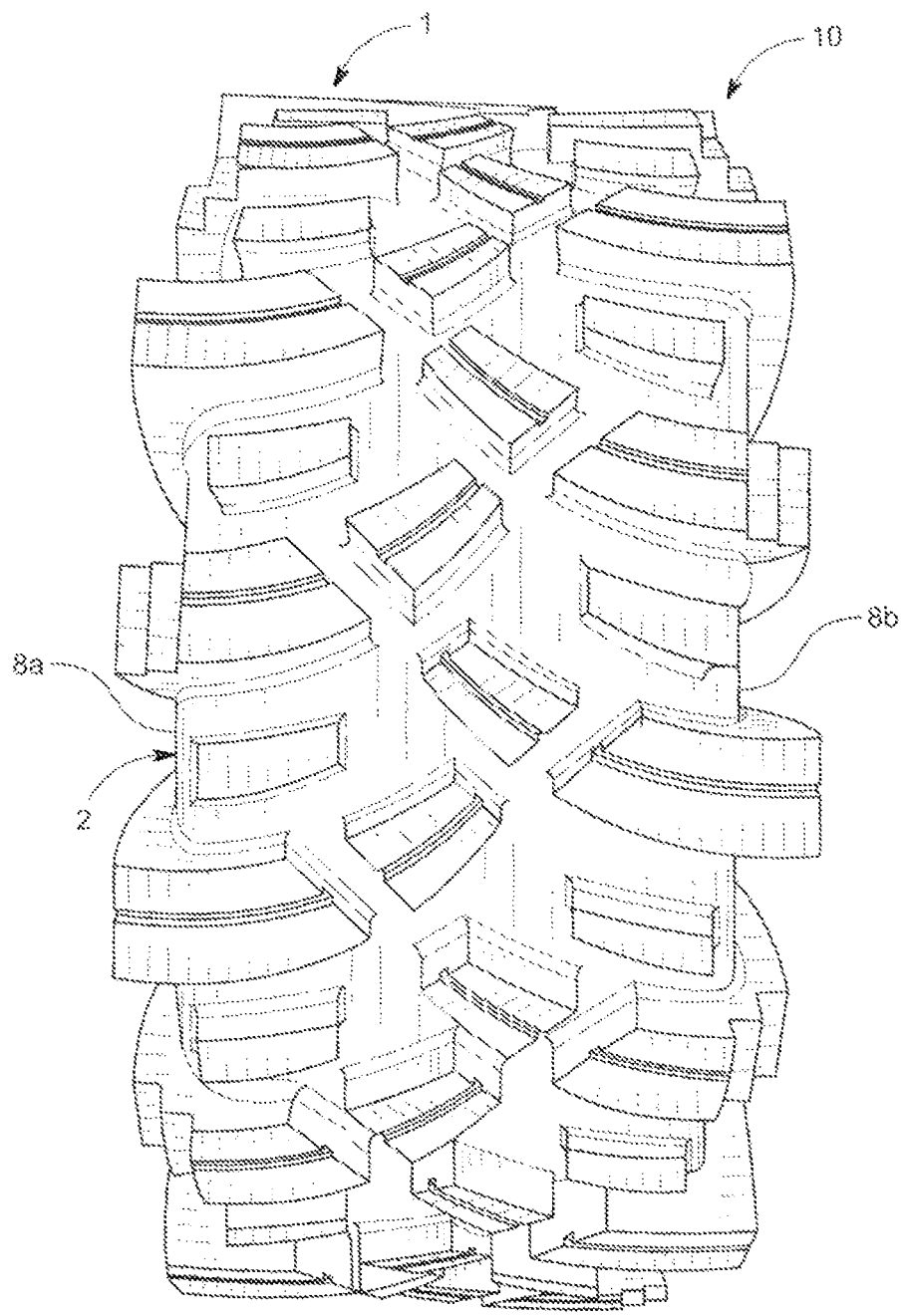
FIG. 2 is a front view of an illustrative embodiment of the pneumatic tires.
Figure 3:
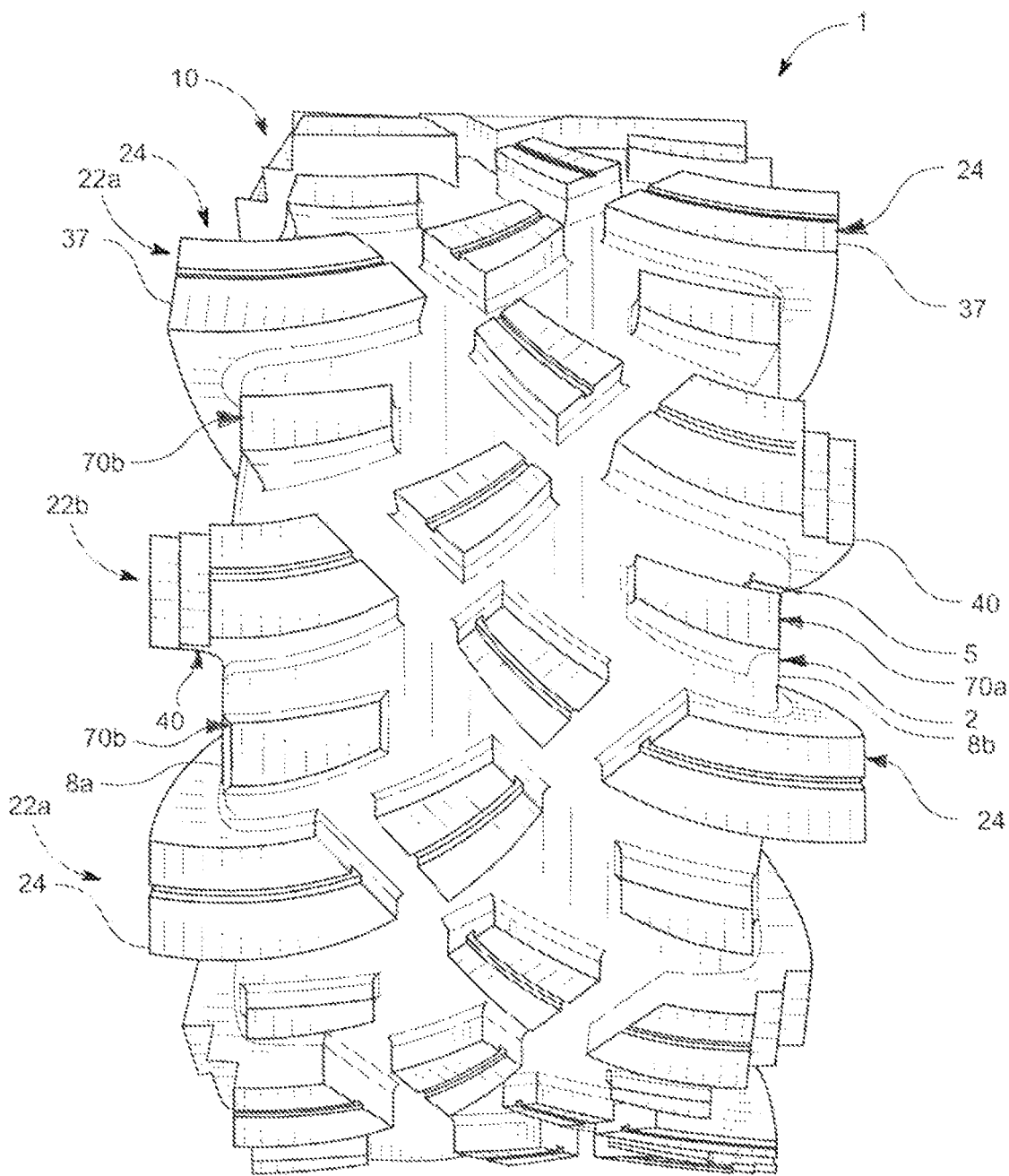
FIG. 3 is art enlarged, close-up front view of an illustrative embodiment of the pneumatic tires.
Figure 4:
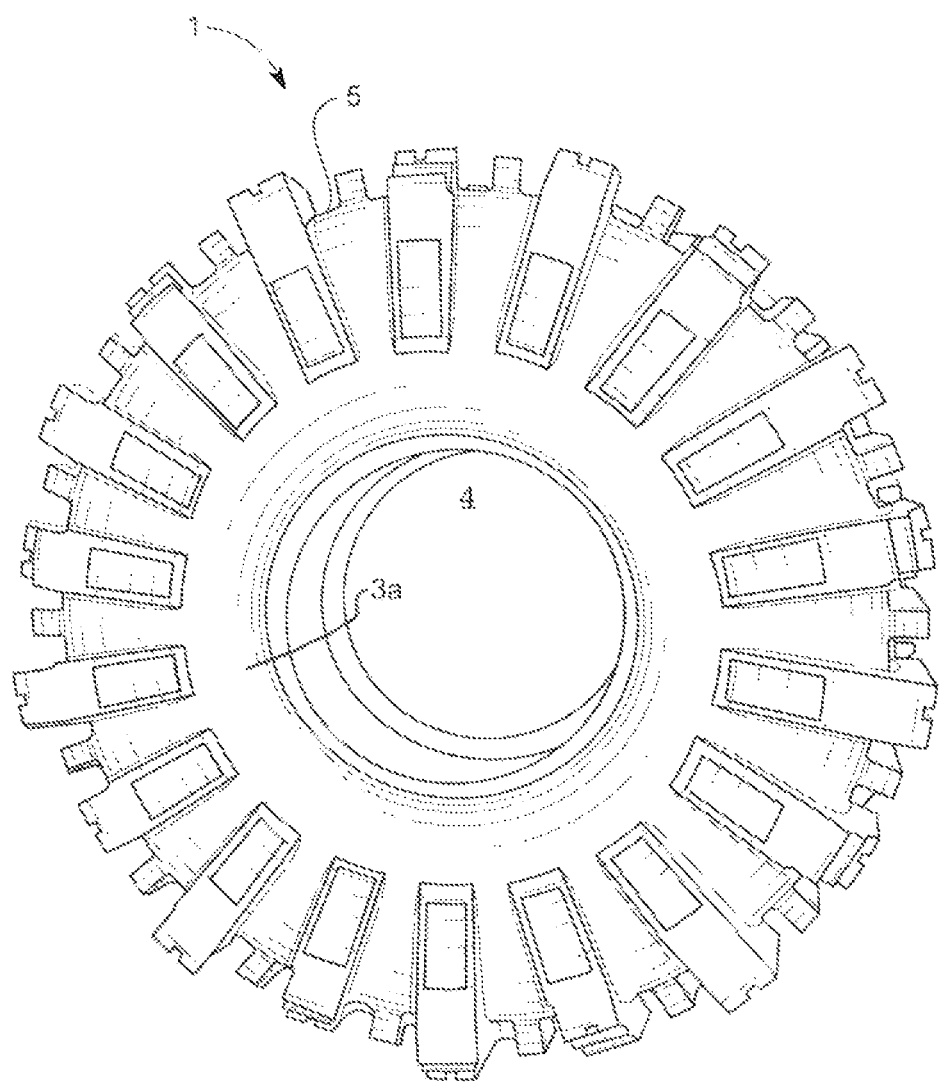
FIG. 4 is a side view of an illustrative embodiment of the pneumatic tires.
Figure 5:
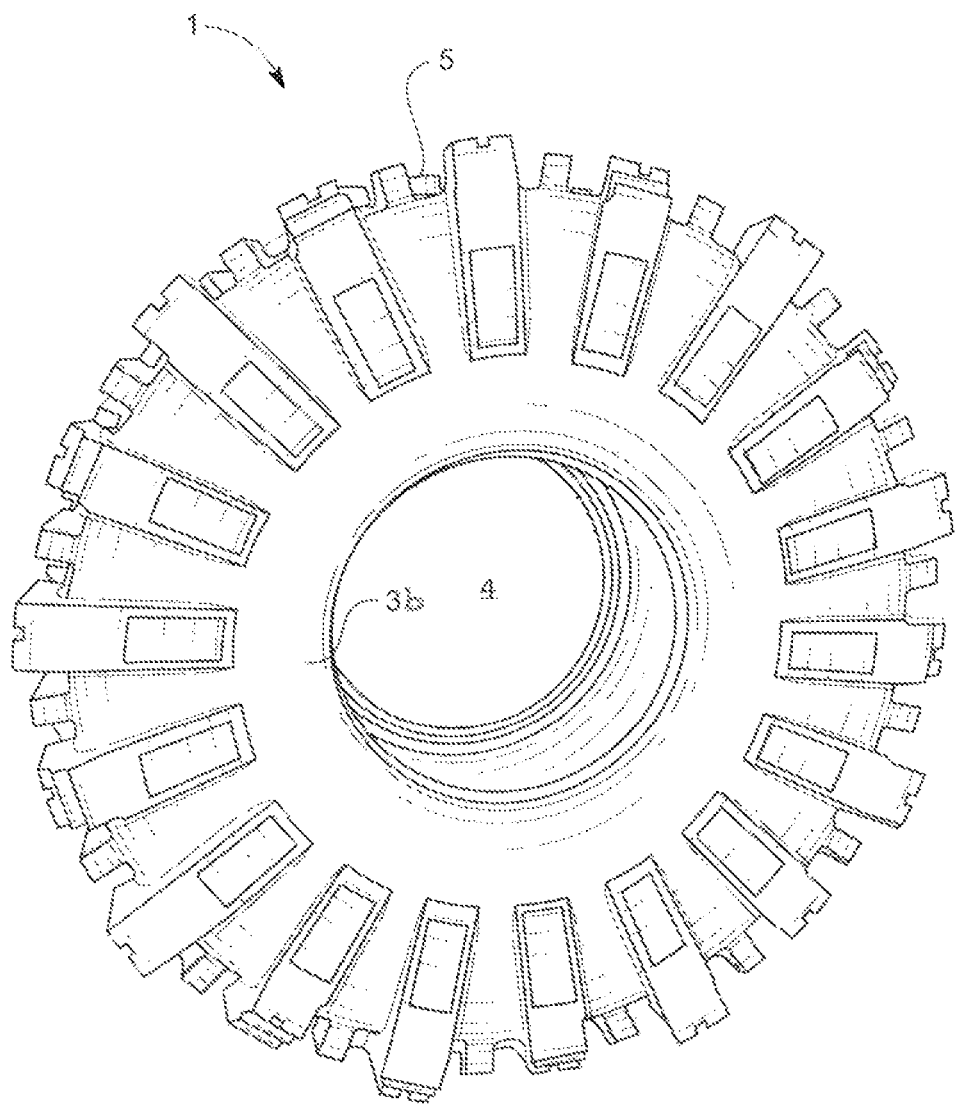
FIG. 5 is an opposite side view of an illustrative embodiment of the pneumatic tires.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be hound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 9:
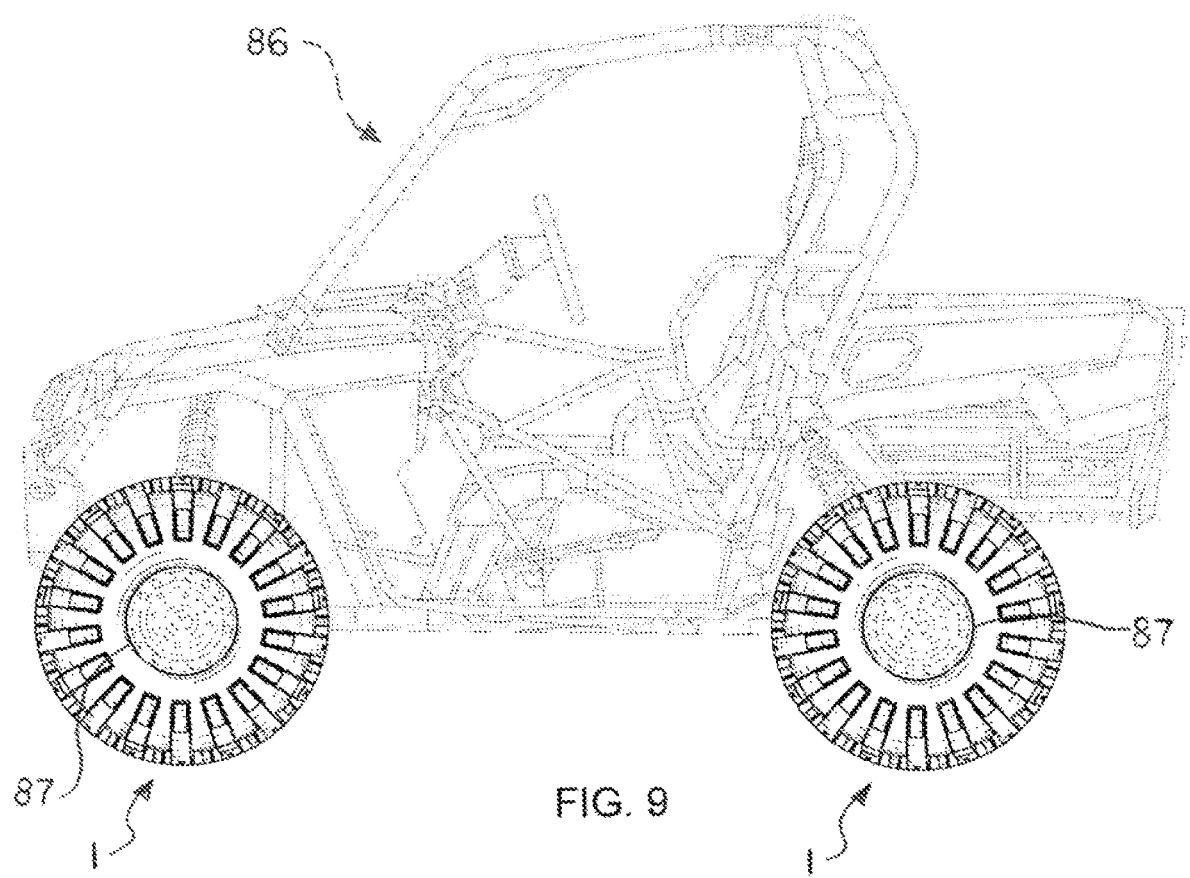
FIG. 9 is a side view of a typical off-road vehicle with a pair of an illustrative embodiment of the pneumatic tires mounted on the vehicle.

Referring to the drawings, an illustrative embodiment of the pneumatic tires is generally indicated by reference numeral 1. In some embodiments, the pneumatic tire 1 may be configured as a tire for an off-road vehicle 86, as illustrated in FIG. 9. The pneumatic tire 1 may include an annular tire body 2. The tire body 2 may have a pair of spaced-apart front and rear tire sidewalls 3a, 3b, respectively. A tire opening 4 may extend through the tire sidewalls 3a, 3b. A tread wall 5 may extend between the tire sidewalls 3a, 3b. The tread wall 5 may meet each of the tire sidewalls 3a, 3b at corresponding first and second tread edges 8a, 8b. In some embodiments, each tread edge 8a, 8b may form an abrupt transition between the tread wall 5 and the corresponding tire sidewall 3a, 3b. In other embodiments, each tread edge 8a, 8b may form a gradual or curved transition between the tread wall 5 and the corresponding tire sidewall 3a, 8b. As used herein, a "tread edge" is an outermost edge of the tread portion 10 which contacts a flat portion of the ground under normally inflated and loaded conditions.

Figure 6:
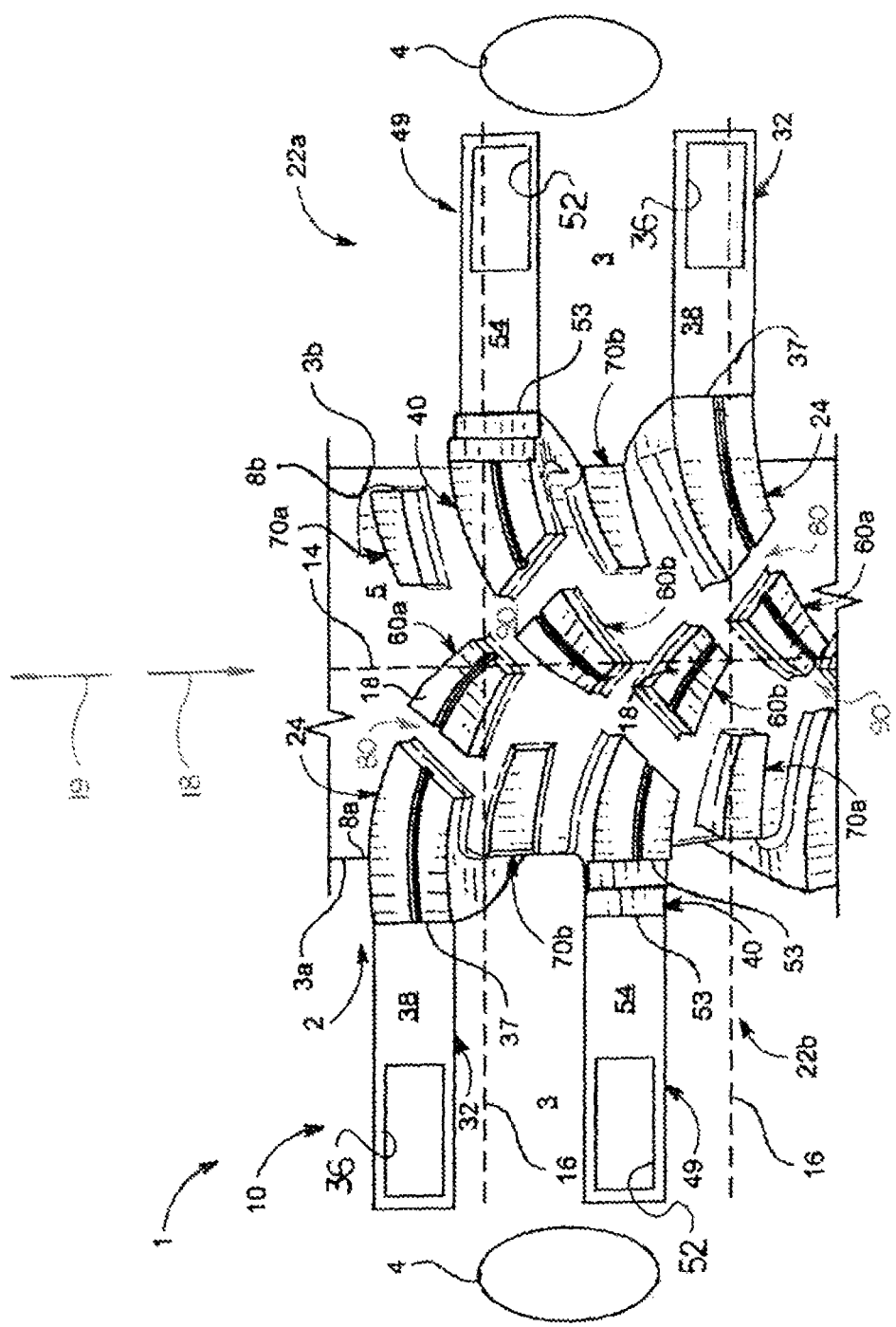
FIG. 6 is a two-dimensional front view showing a typical tread pattern of an illustrative embodiment of the pneumatic tires.

A tread portion 10 may be provided on the exterior circumferential surface of the tread wall 5. As illustrated in FIG. 6, an imaginary tread equator 14 may divide the tread portion 10 into equal front and rear halves. The tread equator 14 may define a first rotational direction 18 and a second rotational direction 19 of the tire body 2.

The tread portion 10 may include repetitive alternating first and second tread patterns 22a, 22b around the circumference of the tread wall 5. As further illustrated in FIG. 6, each of the first tread pattern 22a and the second tread pattern 22b may be oriented along a corresponding longitudinal tread pattern axis 16 which is transverse to the tread equator 14. The first tread pattern 22a and the second tread pattern 22b may repeatedly alternate with each other progressing circumferentially along the tread equator 14.

Figure 7:
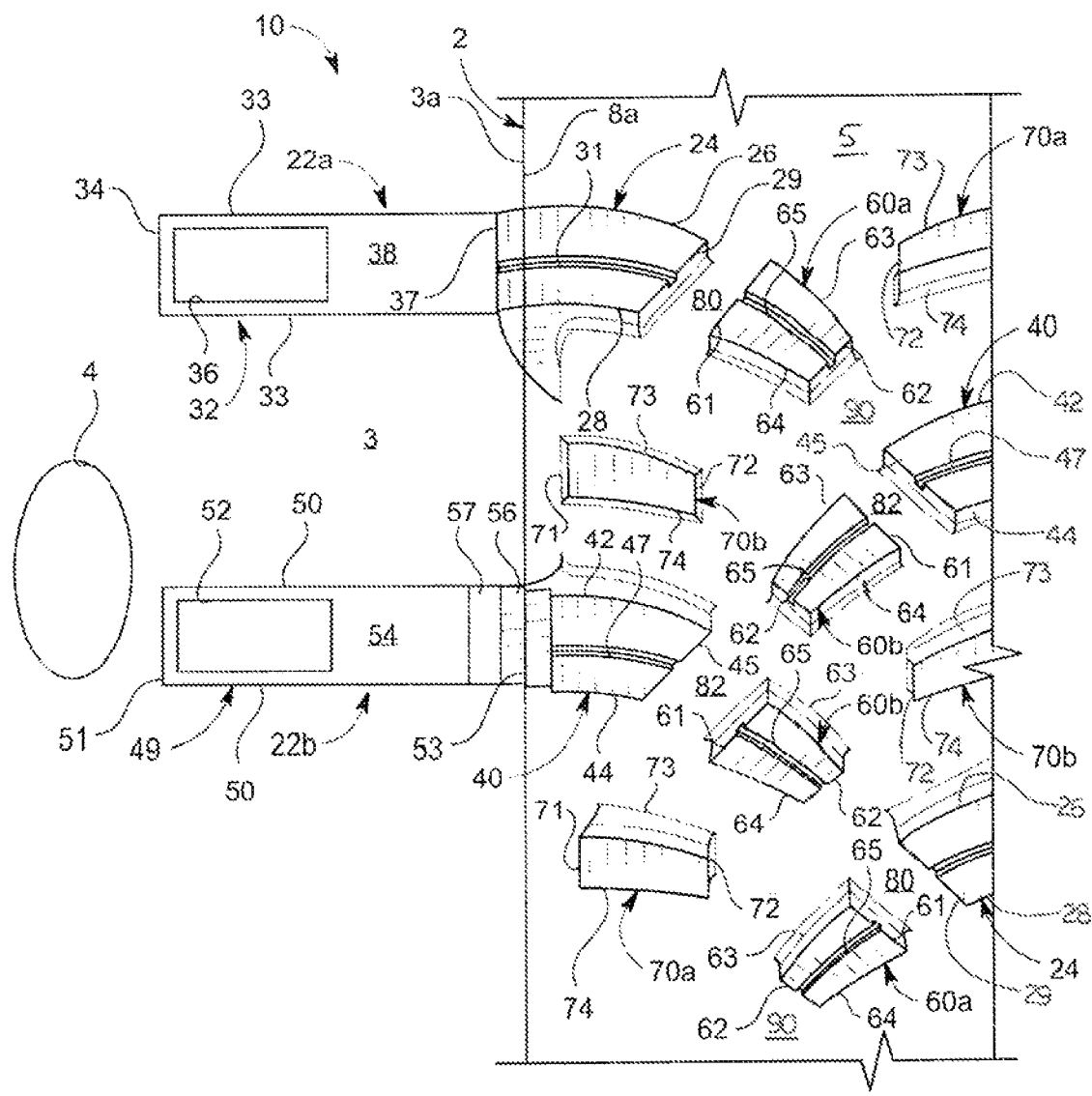
FIG. 7 is an enlarged two-dimensional sectional view showing a typical first half portion of each tread pattern on an illustrative embodiment of the pneumatic tires.
Figure 8:
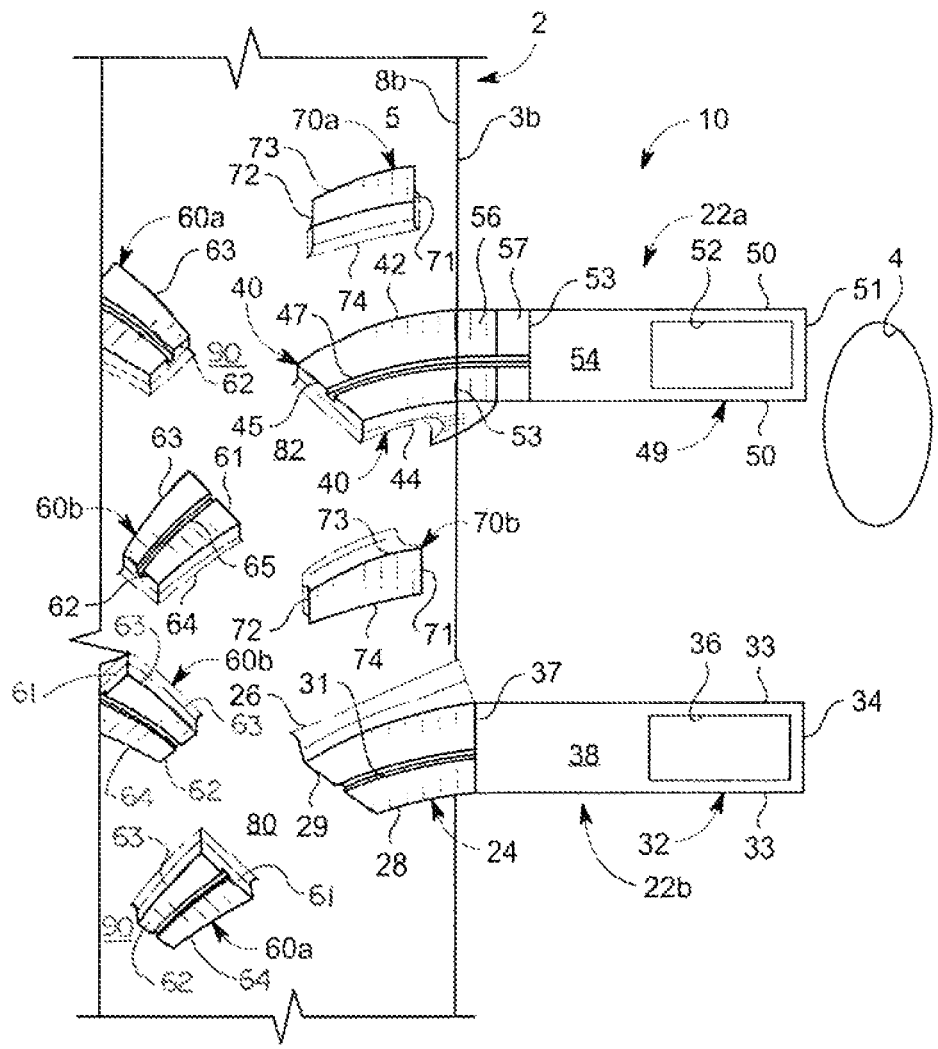
FIG. 8 is an enlarged two-dimensional sectional view showing a typical second half portion of each tread pattern.

As particularly illustrated in FIGS. 6-8, each tread pattern 22a, 22b may include a main land 24 which protrudes from the tread wall 5 on a corresponding side of the tread equator 14. A stepped land 40 may protrude from the tread wall 5 on the opposite side of the tread equator 14. The stepped land 40 may be disposed in offset relationship with respect to the main land 24 on opposite sides of the tread equator 14.

zA main land sidewall portion 32 may extend from the main land 24. The main land sidewall portion 32 may protrude from a first corresponding one of the front sidewall 3a and the rear sidewall 3b. A stepped land sidewall portion 49 may extend from the stepped land 40. The stepped land sidewall portion 49 may protrude from a second corresponding opposite one of the front sidewall 3a and the rear sidewall 3b.

A first equatorial land 60a may protrude from the tread wall 5 between the main land 24 and the stepped land 40. A second equatorial land 60b may protrude from the tread wall 5 in spaced-apart, adjacent relationship to the first equatorial land 60a. The tread equator 14 may extend through the first equatorial land 60a and the second equatorial land 60b. The first equatorial land 60a and the second equatorial land 60b may be disposed in opposite orientations along the tread equator 14, as will be hereinafter further described.

As illustrated in FIGS. 7 and 8, the main land 24 of each tread pattern 22a, 22b may be generally elongated and curved along the longitudinal pattern axis 16 with a convex main land surface 26 and a concave main land surface 28 which may be parallel to each other. A main land edge 37 may mark the transition from the main land 24 to the main land sidewall portion The main land edge 37 may be disposed beyond, outside or exterior to the corresponding tread edge 8a, 8b such that the main land sidewall portion 32 protrudes from the corresponding front tire sidewall 3a and rear tire sidewall 3b. A typically straight inner main land surface 29 may extend from the convex main land surface 26 to the concave main land surface 28.

A main land groove 31 may extend into the main land 24 longitudinally from the main land edge 37 to the inner main land surface 29. The main land groove 31 may bisect the main land 24 into two equal halves.

The main land sidewall portion 32 may extend in a radial direction from the main land edge 37 of the main land 24 toward the tire opening 4. The main land sidewall portion 32 may have a pair of elongated, parallel, spaced-apart sidewall portion side surfaces 33. A sidewall portion transverse surface 34 may extend between the sidewall portion side surfaces 33. A main land sidewall surface 38 may extend from the main land edge 37 to the sidewall portion transverse surface 34. At least one main land cavity 36 may he provided in the main land sidewall surface 38. In some embodiments, the main land cavity 36 may be elongated and rectangular.

As further illustrated in FIGS. 7 and 8 the stepped land 40 of each tread pattern 22a, 22b may be generally elongated and curved along the longitudinal pattern axis 16 and may be parallel to the main land 24. The stepped land 40 may have a convex stepped land surface 42 and a concave stepped land surface 44 which may he parallel to each other. A stepped land edge 53 may mark the transition from the stepped land 40 to the stepped land sidewall portion 49 The stepped land edge 53 may be disposed at or slightly beyond the corresponding front tire sidewall 3a and rear tire sidewall 3b. An inner stepped land surface 45 may extend from the convex stepped land surface 42 to the concave stepped land surface 44. A stepped land groove 47 may extend into the stepped land 40. The stepped land groove 47 may extend from the stepped land edge 53 to the inner stepped land surface 45.

The stepped land sidewall portion 49 may extend in a radial direction from the stepped land edge 53 of the stepped land 40 toward the lire opening 4. The stepped land sidewall portion 49 may have a pair of elongated, parallel, spaced-apart sidewall portion side surfaces 50. A sidewall Portion transverse surface 51 may extend between the sidewall portion side surfaces 50.

A medial step 56 may extend from the stepped land edge 53 of the stepped land 40. A lateral step 57 may extend from the medial step 56. The stepped land sidewall portion 49 may extend in a radial direction from the lateral step 57 toward the tire opening 4.

A stepped land sidewall surface 54 may extend from the lateral step 57 to the sidewall portion transverse surface 51. At least one stepped land cavity 52 may be provided in the stepped land sidewall surface 54. In some embodiments, the stepped land cavity 52 may be elongated and rectangular.

As further illustrated in FIGS. 7 and 8, the first equatorial land 60a of each tread pattern 22a, 22b may have an outer equatorial land surface 61 which faces and is parallel to the inner main land surface 29 of the main land 24. A main land gap 80 may be formed by and between the outer equatorial land surface 61, the tread wall 5 and the inner main land surface 29 of the main land 24. The main land gap 80 may extend across the tread wall 5 from the outer equatorial land surface 61 to the inner main land surface 29, as illustrated, such that the Main land gap 80 interrupts continuity between the first equatorial land 60a and the main land 24. In some embodiments, the main land gap 80 may he oriented at a 45-degree angle with respect to the tread equator 14.

A convex equatorial land surface 63 and a concave equatorial land surface 64 may extend from the outer equatorial land surface 61. The convex equatorial land surface 63 and the concave equatorial land surface 64 may continue the trajectories of the respective convex main land surface 26 and concave main land surface 28 of the main land 24 across the main land gap 80. An inner equatorial land surface 62 may extend between the convex equatorial land surface 63 and the convex equatorial land surface 64. The first equatorial land 60a may taper from the outer equatorial land surface 61 to the inner equatorial land surface 62.

An equatorial land groove 65 may extend into the first equatorial land 60a longitudinally from the outer equatorial land surface 61 to the inner equatorial land surface 62. The equatorial land groove 65 may bisect the first equatorial land 60a into two equal halves.

The second equatorial land 60b may have substantially the same size and shape as the first equatorial land 60a. A stepped land gap 82 may be formed by and between the inner stepped land surface 45 of the stepped land 40, the tread wall 5 and the outer equatorial land surface 61 of the second equatorial land 60b. The stepped land gap 82 may extend across the tread wall 5 from the inner stepped land surface 45 to the outer equatorial land surface 61, as illustrated, such that the stepped land gap 82 interrupts continuity between the second equatorial land 60b and the stepped land 40. In some embodiments, the stepped land gap 82 may be oriented at a 45-degree angle with respect to the tread equator 14. As illustrated in FIG. 8, the convex equatorial land surface 63 and the concave equatorial land surface 64 may continue the trajectories of the respective convex stepped land surface 42 and concave stepped land surface 44 of the stepped land 40 across the stepped land gap 82.

In each tread pattern 22a, 22b, a first lateral land 70a may protrude from the tread wall 5 adjacent to a first corresponding one of the first tread edge 8a and the second tread edge 8b. A second lateral land 70b may protrude from the tread wall 5 adjacent to a second corresponding one of the first tread edge 8a and the second tread edge 8b. Each of the first lateral land 70a and the second lateral land 70b may include an outer lateral land surface 71 which may be parallel and spaced-apart with respect to the corresponding first tread edge 8a and second tread edge 8b. A convex lateral land, surface 73 and a concave lateral land surface 74 may extend from the outer lateral land surface 71. An inner lateral land surface 72 may extend between the convex lateral land surface 73 and the concave lateral land surface 74. The inner lateral land surface 72 of the first lateral land 70a may lace the convex land surface 63 of the first equatorial land 60a. The inner lateral land surface 72 of the second lateral land 70b may face the convex land surface 63 of the second equatorial land 60b. As illustrated in FIGS. 6-8, an equatorial land gap 90 may be formed by and between the inner equatorial land surface 62 of the first equatorial land 60a and the convex stepped land surface 42 of the stepped land 40. The equatorial land gap 90 may extend across the tread wall 5 from the inner equatorial land surface 62 to the convex stepped land surface 42, as illustrated. As illustrated in FIG. 6, each of the main land 24, the stepped land 40, the first lateral land 70a and the second lateral land 70b of each tread pattern 22a, 22b may be curved toward the tread equator 14 in the first rotational direction 18 of the tire body 2. Each of the first equatorial land 60a and the second equatorial land 60b of each tread pattern 22a, 22b may be curved and tapered toward the tread equator 14 in the first rotational direction 18.

As illustrated in FIG. 9, fax typical application the pneumatic tires 1 may be fitted on the respective wheels 87 of an off-road vehicle 86. Accordingly, the pneumatic tires 1 may enhance gripping capability of the wheels 87 on uneven terrain which may include rooks, tree stumps, logs, vegetation, holes, ditches and uneven soil. The alternating configuration of the main lands 24 and the stepped lands 40 on opposite sides of the tread portion 10 may increase surface area between the pneumatic tire 1 and uneven terrain particularly as the weight of the off-mad vehicle 86 may shift from side to side as the terrain is traversed. The main land sidewall portion 32 and the stepped land sidewall portion 49 of each tread pattern 22b may reinforce the structural rigidity of the front tire sidewall 3a and rear tire sidewall 3b responsive to axial compression forces applied to the tire body 2.

As the pneumatic tires 1 traverse the off-road terrain, various elements such as rocks, sticks, branches and the like may be gripped in the main land gaps 80 and the stepped land gaps 82 as well as the equatorial land gap 90 and the gaps between adjacent ones of the lateral lands 70a, 70b and the corresponding adjacent main land 24, first equatorial land 60a, second equatorial land 60b and/or stepped land 40 and between the equatorial lands 60a, 60b to enhance the gripping capability of the pneumatic tires 1 on the terrain. The curved trajectories of the convex main land surface 26, concave main land surface 28, convex stepped land surface 42, concave stepped land surface 44, convex equatorial land surface 63, concave equatorial land surface 64, convex lateral land surface 73 and concave lateral land surface 74, as well as the stepped profile of the medial step 56 and the lateral step 57 on each stepped land sidewall portion 49, may facilitate engagement of irregular surfaces or objects on the terrain during powering of the wheels 87 on the off road vehicle 86. Moreover, the main land edge 37 of each main land 24 and the medial step 56 and the lateral step 57 of each stepped land sidewall portion 49 may protrude beyond the corresponding tread edge 8a, 8b to increase the surface area of the tread portion 10 on the terrain and enhance gripping capability of the pneumatic tire 1. The main land sidewall portion 32 and stepped land sidewall portion 49, as well as the main land cavities 36 and stepped land cavities 52, of each tread pattern 22a, 22b may facilitate gripping of adjacent soil or terrain in the event that the pneumatic tire 1 is submerged in dirt or mud or traverses a hole or other depression in the terrain.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A pneumatic tire, comprising:
a tire body having a first tire sidewall, a second tire sidewall, a tread wall extending between the first tire sidewall and the second tire sidewall, a first tread edge between the tread wall and the first tire sidewall, a second tread edge between the tread wall and the second tire sidewall, a tread portion on the tread wall and the first tire sidewall and the second tire sidewall, and an imaginary tread equator extending circumferentially along the tread wall and dividing the tread portion into equal first and second circumferential halves, the tread equator defining a first rotational direction and a second rotational direction of the tire body, the tread portion including a first tread pattern and a second tread pattern repeatedly alternating with each other on the tread wall progressing circumferentially along the tread equator;
the first tread pattern of the tread portion having:
a first land protruding from the tread wall on a first side of the tread equator, the first land curved toward the tread equator in the first rotational direction;
a first land sidewall portion extending from the first land on the first side of the tread equator and protruding from the first tire sidewall;
a second land protruding from the tread wall on a second side of the tread equator, the second land curved toward the tread equator in the first rotational direction;
a second land sidewall portion extending from the second land 40 on the second side of the tread equator and protruding from the second tire sidewall;
at least one stepped land edge marking a transition from the second land to the second land sidewall portion;
a first equatorial land protruding from the tread wall between and in spaced-apart relationship to the first land and the second land, the first equatorial land curved and tapered toward the tread equator in the first rotational direction and having a first outer equatorial land surface facing the first land and a first inner equatorial land surface at the tread equator, the first equatorial kind curved and tapering from the first outer equatorial land surface to the first inner equatorial land surface;
a first land gap formed by and between the first outer equatorial land surface of the first equatorial land and the first land, the tread wall exposed through the first land gap from the first outer equatorial land surface to the first land;
a first equatorial land gap formed by and between the first inner equatorial land surface of the first equatorial land and the second land, the tread wall exposed through the first equatorial land gap from the first inner equatorial land surface to the second land;
a second equatorial land protruding from the tread wall in spaced-apart, adjacent relationship to the first equatorial land and in spaced-apart relationship to the second land, the second equatorial land curved and tapered toward the tread equator in the first rotational direction and having a second Outer equatorial land surface facing the second land and a second inner equatorial land surface at the tread equator, the second equatorial land curved and tapering from the second outer equatorial land surface to the second inner equatorial land surface;
a second land gap formed by and between the second outer equatorial land surface of the second equatorial land and the second land, the tread wall exposed through the second land gap from the second outer equatorial land surface to the second land;
a first lateral land protruding from the tread wall adjacent to the second tread edge and adjacent to the second land, the first lateral land curved and tapered toward the tread equator in the first rotational direction; and
a second lateral land protruding from the tread wall adjacent to the first tread edge and adjacent to the first land, the second lateral land curved toward the tread equator in the first rotational direction;

the second tread pattern of the tread portion having:
a third land protruding from the tread wall on the second side of the tread equator, the third land curved toward the tread equator in the first rotational direction;
a third land sidewall portion extending from the third land and protruding from the second tire sidewall;
a fourth land protruding from the tread wail on the first side of the tread equator, the fourth land curved toward the tread equator in the first rotational direction;
a fourth land sidewall portion extending from the fourth land and protruding from the first tire sidewall;
at least one stepped land edge marking a transition from the fourth land to the fourth land sidewall portion;
a third equatorial land protruding from the tread wall in spaced-apart relationship to the third land, the third equatorial land curved and tapered toward the tread equator in the first rotational direction and having a third outer equatorial land surface facing the third land and a third inner equatorial land surface at the tread equator, the third equatorial land curved and tapering from the third outer equatorial land surface to the third inner equatorial land surface;
a third land gap formed by and between the third outer equatorial land surface of the third equatorial land and the third land, the tread wall exposed through the third land gap from the third outer equatorial land surface to the third land;
a fourth equatorial land protruding from the tread wall in spaced-apart, adjacent relationship to the third equatorial land and in spaced-apart relationship to the fourth land, the fourth equatorial land curved and tapered toward the tread equator in the first rotational direction and having a fourth outer equatorial land surface facing the fourth land and a fourth inner equatorial land surface at the tread equator, the fourth equatorial land curved and tapering from the fourth outer equatorial land surface to the fourth inner equatorial land surface;
a third lateral land protruding from the tread wall adjacent to the first tread edge and adjacent to the fourth land, the third lateral land curved toward the tread equator in the first rotational direction; and
a fourth lateral land protruding from the tread wall adjacent to the second tread edge and adjacent to the third land, the fourth lateral land curved in the first rotational direction.

2. The pneumatic tire of claim I wherein the tread equator extends through the first equatorial land and the second equatorial land of the first tread pattern and through the third equatorial land and the fourth equatorial land of the second tread pattern.

3. The pneumatic tire of clam wherein the first equatorial land and the second equatorial land are disposed in opposite orientations with each other alone the tread equator and the third equatorial land and the fourth equatorial land are disposed in opposite orientations with each other along the tread equator.

4. The pneumatic tire of claim 1 wherein each of the first land of the first tread pattern and the third land of the second tread pattern has a convex first land surface, a concave second land surface parallel to the convex first land surface and a straight inner first land surface extending from the convex first land surface to the concave second land surface, and each of the second land of the first tread pattern and the fourth land of the second tread pattern has a convex third land surface, a concave fourth land surface parallel to the convex third land surface and a straight inner second land surface extending from the convex third land surface to the concave fourth land surface.

5. The pneumatic tire of claim 4 further comprising a single land edge marking a transition from each of the first land to the first land sidewall portion and the third land to the third land sidewall portion.

6. The pneumatic tire of claim 5 further comprising a first land groove extending into each of the first land and the third land longitudinally from the first land edge to the straight inner first land surface, the first land groove bisecting the each of the first land and the third land into two equal halves, and a second land groove extending into each of the second land and the fourth land longitudinally from the second land edge to the straight inner second land surface, the second land groove bisecting the each of the second land and the fourth land into two equal halves.

7. The pneumatic tire of claim 6 wherein each of the first land sidewall portion and the third land sidewall portion comprises a pair of elongated. parallel, spaced-apart first sidewall portion side surfaces, a first sidewall portion transverse surface extending between the first sidewall portion side surfaces and a first land sidewall surface extending from the first land edge to the first sidewall portion transverse surface, and each of the second land sidewall portion and the fourth land sidewall portion comprises a pair of elongated, parallel, spaced-apart second sidewall portion side surfaces, a second sidewall portion transverse surface extending between the second sidewall portion side surfaces and a second land sidewall surface extending from the second land edge to the second sidewall portion transverse surface.

8. The pneumatic tire of claim 7 further comprising a first land cavity in the first land sidewall surface of each of the first land sidewall portion and the third land sidewall portion and a second land cavity in the second land sidewall surface of each of the second land sidewall portion and the fourth land sidewall portion.

9. A pneumatic tire, comprising:
a tire body having a first tire sidewall, a second tire sidewall, a tread wall extending between the first tire sidewall and the second tire sidewall, a first tread edge between the tread wall and the first tire sidewall, a second tread edge between the tread wall and the second tire sidewall, a tread portion on the tread wall and the first tire sidewall and the second tire sidewall, and an imaginary tread equator extending circumferentially along the tread wall and dividing the tread portion into equal first and second circumferential halves, the tread equator defining a first rotational direction and a second rotational direction of the tire body, the tread portion including a first tread pattern and a second tread pattern repeatedly alternating with each other on the tread wall progressing circumferentially along the tread equator;

the first tread pattern of the tread portion having:
- a first land protruding from the tread wall on a first side of the tread equator, the first land curved toward the tread equator in the first rotational direction;
- a first land sidewall portion extending from the first land on the first side of the tread equator and protruding from the first tire sidewall;
- a second land protruding from the tread wall on a second side of the tread equator, the second land curved toward the tread equator in the first rotational direction;
- a second land sidewall portion extending from the second land on the second side of the tread equator and protruding from the second tire sidewall;
- at least one stepped land edge marking a transition from the second land to the second land sidewall portion;
- a first equatorial land protruding from the tread wall between and in spaced-apart relationship to the first land and the second land, the first equatorial land curved and tapered toward the tread equator in the first rotational direction and including:
  - a first outer equatorial land surface facing the first land; and
  - a first inner equatorial land surface extending beyond the tread equator, the first equatorial land curved and tapering from the first outer equatorial land surface to the first inner equatorial land surface;
- a first land gap formed by and between the fast outer equatorial land surface of the first equatorial land and the first land, the tread wall exposed through the first land gap from the first outer equatorial land surface to the first land, the first land gap interrupting continuity between the first equatorial land and the first land;
- a first equatorial land gap formed by and between the first inner equatorial land surface of the first equatorial land and the second land, the tread wall exposed through the first equatorial land gap from the first inner equatorial land surface to the second land;
- a second equatorial land protruding from the tread wall in spaced-apart, adjacent relationship to the first equatorial land and in spaced-apart relationship to the second land, the second equatorial land curved and tapered toward the tread equator in the first rotational direction and including:
  - a second outer equatorial land surface facing the second land; and
  - a second inner equatorial land surface extending beyond the tread equator, the second equatorial land curved and tapering from the second outer equatorial land surface to the second inner equatorial land surface;
- a second land gap formed by and between the second outer equatorial land surface of the second equatorial land and the second land, the tread wall exposed through the second land gap from the second outer equatorial land surface to the second land, the second land gap interrupting continuity between the second equatorial land and the second land;
- a first lateral land protruding from the tread wall adjacent to the second tread edge and adjacent to the second land, the first lateral land curved toward the tread equator in the first rotational direction; and
- a second lateral land protruding from the tread wall adjacent to the first tread edge and adjacent to the first land, the second lateral land curved toward the tread equator in the first rotational direction;

the second tread pattern of the tread portion having:
- a third land protruding from the tread wall on the second side of the tread equator, the third land curved toward the tread equator in the first rotational direction;
- a third land sidewall portion extending from the third land and protruding from the second tire sidewall;
- a fourth land protruding from the tread wall on the first side of the tread equator, the fourth land curved toward the tread equator in the first rotational direction;
- a fourth land sideman portion extending from the fourth land and protruding from the first tire sidewalk
- at least one stepped land edge marking a transition from the fourth land to the fourth land sidewall portion;
- a third equatorial land protruding from the tread wall in spaced-apart relationship to the third land, the third equatorial land curved and tapered toward the tread equator in the first rotational direction and including:
  - a third outer equatorial land surface facing the third land; and
  - a third inner equatorial land surface extending beyond the tread equator, the third equatorial land curved and tapering from the third outer equatorial land surface to the third inner equatorial land surface;
- a third land gap formed by and between the third outer equatorial land surface of the third equatorial land and the third land, the tread wall exposed through the third land gap from the third outer equatorial land surface to the third land, the third land gap interrupting continuity between the third equatorial land and the third land;
- a fourth equatorial land protruding from the tread wall in spaced-apart, adjacent relationship to the third equatorial land and in spaced-apart relationship to the fourth land, the fourth equatorial land curved and tapered toward the tread equator in the first rotational direction and including:
  - a fourth outer equatorial land surface facing the fourth land; and
  - a fourth inner equatorial land surface extending beyond the tread equator, the fourth equatorial land curved and tapering from the fourth outer equatorial land surface to the fourth inner equatorial land surface;
- a fourth land gap formed by and between the fourth outer equatorial land surface of the fourth equatorial land and the fourth land, the tread wall exposed through the fourth land gap from the fourth outer equatorial land surface to the fourth land, the fourth land gap interrupting continuity between the fourth equatorial land and the fourth land;
- a third lateral land protruding from the tread wall adjacent to the first tread edge and adjacent to the fourth land, the third lateral land curved toward the tread equator in the first rotational direction; and
- a fourth lateral land protruding from the tread wall adjacent to the second tread edge and adjacent to the third land, the fourth lateral land curved toward the tread equator in the first rotational direction.

10. The pneumatic tire of claim 9 wherein the tread equator extends through the first equatorial land and the second equatorial land of the first tread pattern and through the third equatorial land and the fourth equatorial land of the second tread pattern.

11. The pneumatic tire of claim 10 wherein the first equatorial land and the second equatorial land are disposed in opposite orientations with each other along the tread equator and the third equatorial land and the fourth equatorial land are disposed in opposite orientations with each other along the tread equator.

12. The pneumatic tire of claim 9 wherein each of the first land of the first tread pattern and the third land of the second tread pattern has a convex first land surface, a concave second land surface parallel to the convex first land surface and a straight inner first land surface extending from the convex first land surface to the concave second land surface, and each of the second land of first tread pattern and the fourth land of the second tread pattern has a convex third land surface, a concave fourth land surface parallel to the convex third land surface and a straight inner second land surface extending from the convex third land surface to the concave fourth land surface.

13. The pneumatic tire of claim 12 further comprising a single land edge marking a transition from each of the first land to the first land sidewall portion and the third land to the third land sidewall portion.

14. The pneumatic tire of claim 13 further comprising a first land groove extending into each of the first land and the third land longitudinally from the first land edge to the straight inner first land surface, the first land groove bisecting the each of the first land and the third land into two equal halves, and a second land groove extending into each of the second land and the fourth land longitudinally from the second land edge to the straight inner second land surface, the second land groove bisecting the each of the second land and the fourth land into two equal halves.

15. The pneumatic ire of claim 14 wherein each of the first land sidewall portion and the third land sidewall portion comprises a pair of elongated, parallel, spaced-apart first sidewall portion side surfaces, a first sidewall portion transverse surface extending between the first sidewall portion side surfaces and a first land sidewall surface extending from the first land edge to the first sidewall portion transverse surface, and each of the second land sidewall portion and the fourth land sidewall portion comprises a pair of elongated, parallel, spaced-apart second sidewall portion side surfaces, a second sidewall portion transverse surface extending between the second sidewall portion side surfaces and a second land sidewall surface extending from the second land edge to the second sidewall portion transverse surface.

16. The pneumatic tire of claim 15 further comprising a first land cavity in the first land sidewall surface of each of the first land sidewall portion and the third land sidewall portion and a second land cavity in the second land sidewall surface of each of the second land sidewall portion and die fourth land sidewall portion.

17. A pneumatic tire, comprising:
a tire body having a first tire sideman, a second tire sidewall, a tread wall extending between the first tire sidewall and the second tire sidewall, a first tread edge between the tread wall and the first tire sidewall, a second tread edge between the tread wall and the second tire sidewall, a tread portion on the tread wall and the first tread sidewall and the second tread sidewall, and an imaginary tread equator extending circumferentially along the tread wall and dividing the tread portion into equal first and second circumferential halves, the tread equator defining a first rotational direction and a second rotational direction of the tire body, the tread portion including a first tread pattern and a second tread pattern repeatedly alternating with each other on the tread wall progressing circumferentially along the tread equator;
the first tread pattern of the tread portion having:
a first land protruding from the tread wall on a first side of the tread equator, the first land curved toward the tread equator in the first rotational direction;
a first land sidewall portion extending from the first land on the first side of the tread equator and protruding from the first tire sidewall;
a second land protruding from the tread wall on a second side of the tread equator, the second land curved toward the tread equator in the first rotational direction;
a second land sidewall portion extending from the second land on the second side of the tread equator and protruding from the second tire sidewall;
at least one stepped land edge marking a transition from the second land to the second land sidewall portion;
a first equatorial land protruding from the tread wall between and in spaced-apart relationship to the first land and the second land, the first equatorial land curved and tapered toward the tread equator in the first rotational direction and including:
a first outer equatorial land surface facing the first land; and
a first inner equatorial land surface extending beyond the tread equator, the first equatorial land curved and tapering from the first outer equatorial land surface to the first inner equatorial land surface;
a first land gap formed by and between the first outer equatorial land surface of the first equatorial land and the first land, the tread wall exposed through the first land gap from the first outer equatorial land surface to first the, the first land gap interrupting continuity between the first equatorial land and the first land;
a first equatorial land gap formed by and between the first inner equatorial land surface of the first equatorial land and the second land, the tread wall exposed through the first equatorial land gap from the first inner equatorial land surface to the second land;
a second equatorial land protruding from the tread all in spaced-apart, adjacent relationship to the first equatorial land and in spaced-apart relationship to the second land, the tread equator extending through the first equatorial land and the second equatorial land and the first equatorial land and the second equatorial land disposed in opposite orientations along the tread equator, the second equatorial land curved and tapered toward the tread equator in the first rotational direction and including:
a second outer equatorial land surface facing the second land; and
a second inner equatorial land surface extending beyond the tread equator, the second equatorial land curved and tapering from the second outer equatorial land surface to the second inner equatorial land surface;
a second land gap formed by and between the second outer equatorial land surface of the second equatorial land and the second land, the tread wall exposed through, the second land gap from the second outer equatorial land surface to the second land, the second land gap interrupting continuity between the second equatorial land and the second land;

a first lateral land protruding from the tread wall adjacent to the second tread edge and adjacent to the second land, the first lateral land curved toward the tread equator in the first rotational direction; and a second lateral land protruding from the tread wall adjacent to the first tread edge and adjacent to the first land, the second lateral land curved and tapered toward the tread equator in the first rotational direction;

the second tread pattern of the tread portion having:

a third land protruding from the tread wall on the second side of the tread equator, the third land curved toward the tread equator in the first rotational direction;

a third land sidewall portion extending From the third land on the second side of the tread equator and protruding from the second tire sidewall;

a fourth land protruding from the tread wall on the first side of the tread equator, the fourth land curved toward the tread equator in the first rotational direction;

a fourth land sidewall portion extending from the fourth land on the first side of the tread equator and protruding from the first tire sidewall;

at least one stepped land edge marking a transition from the fourth land to the fourth land sidewall portion;

a third equatorial land protruding from the tread wall in spaced-apart relationship to the third land, the third equatorial land curved and tapered toward the tread equator in the first rotational direction and including:

a third outer equatorial land surface facing the third land; and a third inner equatorial land surface extending beyond the tread equator, the third equatorial land curved and tapering from the third outer equatorial land surface to the third inner equatorial land surface;

a third land gap formed by and between the third outer equatorial land surface of the third equatorial land and the third land, the tread wall exposed through the third land gap from the third outer equatorial land surface to the third land, the third land gap interrupting continuity between the third equatorial land and the third land;

a fourth equatorial land protruding from the tread wall in spaced-apart, adjacent relationship to the third equatorial land and in spaced-apart relationship to the fourth land, the tread equator extending through the third equatorial land and the fourth equatorial land and the third equatorial land and the fourth equatorial land disposed in opposite orientations along the tread equator, the fourth equatorial land curved and tapered toward the tread equator in the first rotational direction and including:

a fourth outer equatorial land surface facing the fourth land; and a fourth inner equatorial land surface extending beyond the tread equator, the fourth equatorial land curved and tapering from the fourth outer equatorial land surface to the fourth inner equatorial land surface;

a fourth land gap formed by and between the fourth outer equatorial land surface of the fourth equatorial land and the fourth land, the tread wall exposed thigh the fourth land gap from the fourth outer equatorial land surface to the fourth land, the fourth land gap interrupting contiguity between the fourth equatorial land and the fourth land;

a third lateral land protruding from the tread wall adjacent to the first tread edge and adjacent to the fourth land, the third lateral land curved toward the tread equator in the first rotational direction; and a fourth lateral land protruding from the tread wall adjacent to the second tread edge and adjacent to the third land, the fourth lateral land curved toward the tread equator in the first rotational direction;

each of the first land of the first tread pattern and the third land of the second tread pattern elongated and curved and having a convex first land surface, a concave second land surface parallel to the convex first land surface and a straight inner first land surface extending from the convex first land surface to the concave second land surface;

each of the second land of the first tread pattern and the fourth land of the second tread pattern elongated and curved and having a convex third land surface, a concave fourth land surface parallel to the convex third land surface and a straight inner second land surface extending from the convex third land surface to the concave fourth land surface; and whereby the third land sidewall portion and the fourth land sidewall portion of the second tread pattern alternate on opposite sides of the tread equator with the second land sidewall portion and the first land sidewall portion, respectively, of the first tread pattern, progressing circumferentially along the tread equator.

18. The pneumatic tire of claim 17 further comprising a single first land edge marking a transition from each of the first land to the first land sidewall portion and the third land to the third land sidewall portion.

19. The pneumatic tire of claim 18 further comprising a first land groove extending into each of the first land and the third land longitudinally from the first land edge to the straight inner first land surface, the first land groove bisecting each of the first land and the third land into two equal halves, and a second land groove extending into each of the second land and the fourth land longitudinally from the second land edge to the straight inner second land surface, the second land groove bisecting the each of the second land and the fourth land into two equal halves.

20. The pneumatic tire of claim 19 wherein each of the first land sidewall portion and the third land sidewall portion comprises a pair of elongated, parallel, spaced-apart first sidewall portion side surfaces, a first sidewall portion transverse surface extending between the first sidewall portion side surfaces and a first land sidewall surface extending from the first land edge to the first sidewall portion transverse surface, and each of the second land sidewall portion and the fourth land sidewall portion comprises a pair of elongated, parallel, spaced-apart second sidewall portion side surfaces, a second sidewall portion transverse surface extending between the second sidewall portion side surfaces and a second land sidewall surface extending from the second land edge to the second sidewall portion transverse surface.

* * * * *